Feb. 13, 1951 G. L. HAMRE 2,541,759
FISHING POLE
Filed Oct. 3, 1947
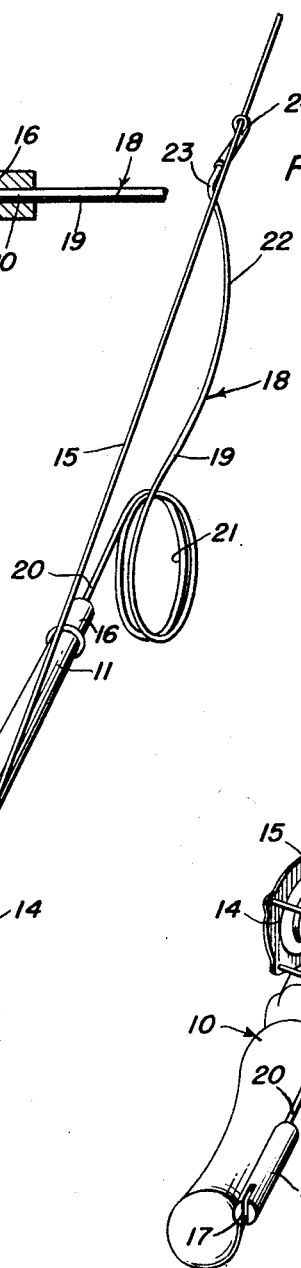
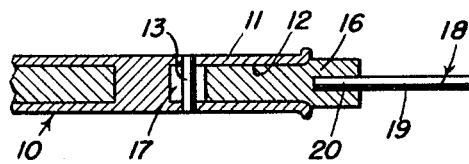
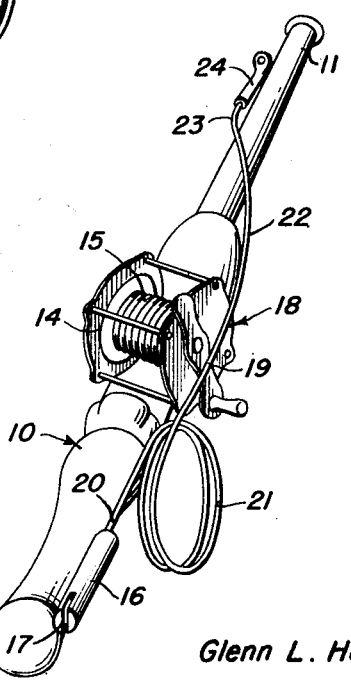
Glenn L. Hamre
INVENTOR.

UNITED STATES PATENT OFFICE 2,541,759

FISHING POLE

Glenn L. Hamre, Chicago, Ill., assignor to The Hamre Specialty Company, Chicago, Ill.

Application October 3, 1947, Serial No. 777,729

1 Claim. (Cl. 43—18)

This invention relates to a fishing pole and more particularly to a casting rod.

The primary object of this invention is to facilitate the accuracy with which a cast may be made, as well as to enable the bait or plug to travel a distance substantially equal to that of a conventional type of casting rod.

Another object is to enable an amateur fisherman to quickly learn the art of casting and at the same time preserve the full rod action during the playing of the fish after it has been caught on the hook.

A further object is to facilitate the transportation and storage of the fishing rod when it is not in use.

A still further object is to avoid entanglement with overhead bushes during the casting process and also avoid entanglement of the rod in underbrush such as is found along streams and lakes.

The above and other objects may be attained by employing this invention which embodies among its features a handle having an axial socket entering one end, a bowed rod removably held in said socket, a line guiding eye at the end of the rod remote from the handle and a loop intermediate the ends of the rod to lend flexibility thereto.

Other features include means properly to orient the rod with relation to the handle so as to preserve the proper planar relationship between the handle, the bow of the rod, and the loop.

In the drawing:

Figure 1 is a perspective view of a fishing pole embodying the features of this invention;

Figure 2 is a view similar to Figure 1 showing the parts separated for transportation or storage, and;

Figure 3 is a fragmentary enlarged longitudinal sectional view illustrating the manner in which the bowed rod is coupled to the handle.

Referring to the drawing in detail a fishing pole handle designated generally 10 is provided at one end with a cylindrical extension 11 formed with an axial socket 12. Extending diametrically through extension 11 near the inner end of the socket 12 is a transverse pin 13, the purpose of which will be more fully hereinafter explained. As shown the handle 10 has removably mounted thereon a conventional reel 14 upon which is wound a conventional fishing line which as illustrated in Figure 1 is carried forwardly beyond the end of the handle carrying the socket 12 when the device is in use.

Removably fitted into the socket 12 is a cylindrical coupling member 16 having formed in one end a transversely extending slot 17 lying in the plane in which the rod is bowed which when the cylindrical coupling member is entered fully into the socket 12 receives the pin 13 properly to orient the rod designated generally 18. The rod 18 above referred to comprises a continuous length of wire 19 which when extended is substantially equal to the length of a conventional casting rod, and one end 20 of the rod 18 is securely fixed in the coupling member 16 to extend axially from the end thereof opposite the slot 17. As illustrated in Figures 1 and 2 the end of the portion 20 of the rod 18 adjacent that part which is fixed in the coupling 16 is looped as at 21 into several contiguous convolutions which lie concentric about an axis which lies in a plane perpendicular to the longitudinal axis of the handle. After forming the loop 21, the rod 18 continues forwardly along an axis which lies substantially parallel to the axis of the coupling 16, and is bowed as at 22 in a plane which lies in parallel relation to the longitudinal axis of the coupling 16 and along the axis of the forwardly projecting portion. The end of the bowed portion 22 remote from the loop 21 is bent at a relatively sharp angle as at 23, and carries a line guiding eye 24, the axis of which lies in a plane substantially in axial alignment with the axis of the coupling 16.

In use the coupling member 16 is entered into the slot 12 as illustrated in Figure 3 so that the portion 20 of the rod 18 lies in substantially axial alignment with the longitudinal axis of the socket 12, and the pin 13 is received in the slot 17. The axis of the pin 13 is so arranged that it will properly orient the rod 18 in relation to the handle 10 when the parts are thus assembled in order that the fishing line 15 upon leaving the reel 14 may be threaded through the eye 24 as illustrated in Figure 1. With the parts thus assembled, a cast may be made in the ordinary way, but due to the short length of the rod 18, danger of entanglement of the rod with bushes and branches of the surrounding growth is materially reduced. When a fish is caught on the hook carried by the line 15 it is obvious that the loop 21 will provide resiliency for the bowed portion 22 of the rod 18, so that the fish may be played in a conventional manner while it is being landed.

Owing to the fact that the overall length of the rod 18 is substantially equal only to that of the handle 10 it is evident that upon landing a fish, the catch will be within easy reach of the fisherman so that it may be removed from the water by the use of an ordinary net or gaff hook, and the fisherman need not let go of the handle in order to land the fish. Likewise due to the relatively short length of the rod 18, when the parts are disassembled as illustrated in Figure 2 the handle and rod will occupy a minimum amount of space so that it may be easily stored or transported, and in fact in some instances may be placed within the conventional bait box. At the same time due to the loop 21 the resilience of the rod will be substantially equal to that of a conventional casting rod, so that all of the advantages of the conventional casting rod will be found when employing a casting rod embodying the features of this invention.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

A fishing pole comprising a handle having an axial socket at one end, a pin extending diametrically through the socket, a bowed rod of substantially equal length with the handle, a cylindrical coupling member fixed to one end of the rod, said coupling member being adapted to enter the socket and having a slot opening through the end remote from the rod, said slot lying in the plane in which the rod is bowed and being adapted to receive the pin properly to orient the rod relative to the handle, a line guiding eye at the end of the rod remote from the coupling member, and a loop having several convolutions formed intermediate the ends of said rod, said convolutions lying concentric about an axis which is perpendicular to a plane which includes the longitudinal axis of the handle.

GLENN L. HAMRE.

REFERENCES CITED

The following references are of record in the file of this patent:

UNITED STATES PATENTS

| Number | Name | Date |
|---|---|---|
| D. 139,078 | Blando | Oct. 10, 1944 |
| 1,475,408 | Reed | Nov. 27, 1923 |
| 1,731,173 | Pope | Oct. 8, 1929 |
| 1,843,714 | Fuller | Feb. 2, 1932 |
| 2,157,819 | Eckert | May 9, 1939 |
| 2,229,084 | Horne | Jan. 21, 1941 |
| 2,282,233 | McFerron | May 5, 1942 |
| 2,351,734 | Backe | June 20, 1944 |
| 2,447,720 | Thomas | Aug. 28, 1948 |

FOREIGN PATENTS

| Number | Country | Date |
|---|---|---|
| 34,021 | Sweden | Dec. 18, 1912 |